United States Patent [19]

Mizukami

[11] Patent Number: 5,413,873
[45] Date of Patent: May 9, 1995

[54] MAGNETIC RECORDING MEDIUM HAVING A GLASS OR AMORPHOUS CARBON SUBSTRATE, VANADIUM OR MOLYBDENUM PRECOAT LAYER, CHROMIUM PRIMER LAYER AND COBALT MAGNETIC LAYER

[75] Inventor: Makoto Mizukami, Yokosuka, Japan

[73] Assignee: Victor Company of Japan, Ltd., Yokohama, Japan

[21] Appl. No.: 96,850

[22] Filed: Jul. 26, 1993

Related U.S. Application Data

[63] Continuation of Ser. No. 873,759, Apr. 27, 1992, abandoned.

[30] Foreign Application Priority Data

Apr. 26, 1991 [JP] Japan .................................. 3-125397

[51] Int. Cl.⁶ .............................................. G11B 5/00
[52] U.S. Cl. ...................................... 428/611; 428/216; 428/336; 428/408; 428/457; 428/662; 428/663; 428/664; 428/666; 428/667; 428/687; 428/694 TS; 428/694 TC; 428/694 ST
[58] Field of Search ................ 427/131; 428/336, 408, 428/457, 611, 651, 660, 662, 663, 666, 667, 668, 680, 687, 692, 694, 900, 928, 694 TS, 694 TC, 216, 664, 694 ST

[56] References Cited

U.S. PATENT DOCUMENTS

| | | | |
|---|---|---|---|
| 3,243,269 | 3/1966 | Lommel et al. | 29/183.5 |
| 4,552,820 | 11/1985 | Lin et al. | 428/611 |
| 4,725,840 | 4/1988 | Hedgcoth | 428/65 |
| 4,816,311 | 3/1989 | Lenhart | 428/64 |
| 4,833,020 | 5/1989 | Shiroishi et al. | 428/336 |
| 4,876,117 | 10/1989 | Bornstein | 427/130 |
| 5,024,903 | 6/1991 | Mizukami | 428/694 |
| 5,122,423 | 6/1992 | Hase et al. | 428/694 |
| 5,242,728 | 9/1993 | Mizukami | 428/64 |
| 5,314,745 | 5/1994 | Okumura | 428/336 |

FOREIGN PATENT DOCUMENTS

| | | |
|---|---|---|
| 0399747 | 11/1990 | European Pat. Off. . |
| 61-243928 | 4/1985 | Japan . |
| 61-188732 | 8/1986 | Japan . |
| 61-222021 | 10/1986 | Japan . |
| 62-205517 | 9/1987 | Japan . |

*Primary Examiner*—Stevan A. Resan
*Attorney, Agent, or Firm*—Jacobson, Price, Holman & Stern

[57] ABSTRACT

A magnetic recording medium comprising:
a precoat layer, having a thickness of 30 to 14000 Å, consisting of any of V (vanadium), Mo (molybdenum), NiP (nickel-phosphorus), C (carbon), Zr (zirconium) or Al (aluminum) formed on a non-magnetic, mirror-surface substrate 1, and
a Cr (chromium) layer as a primer layer 3 and a Co (cobalt) alloy layer as a magnetic layer 4 laminated in order on the precoat layer 2.

3 Claims, 5 Drawing Sheets

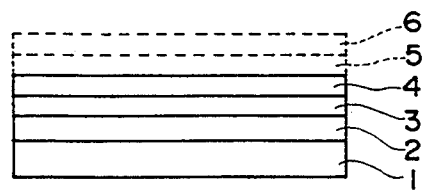
F I G . 1
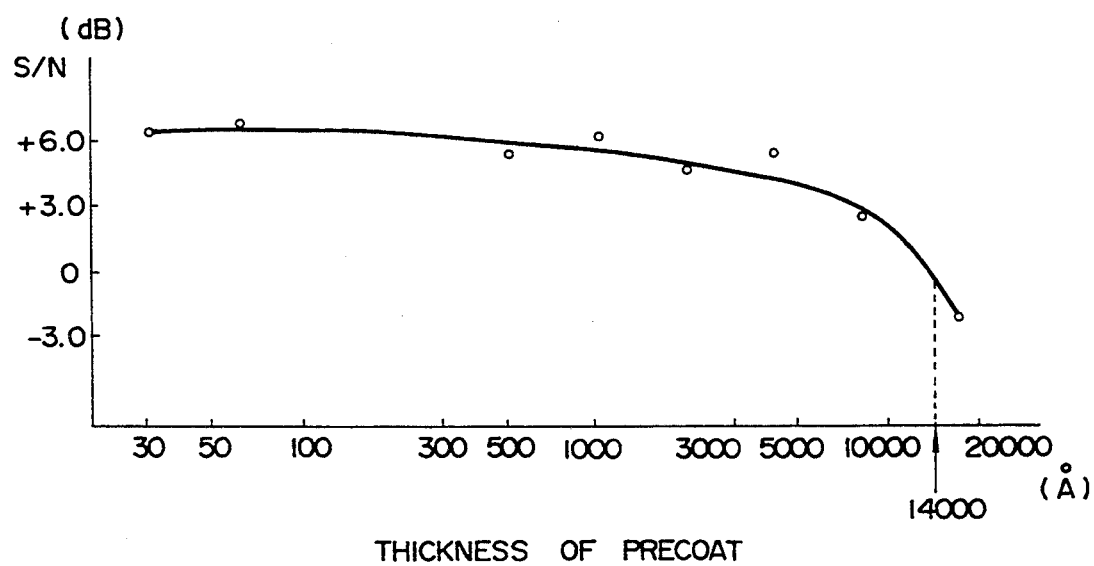
F I G . 2

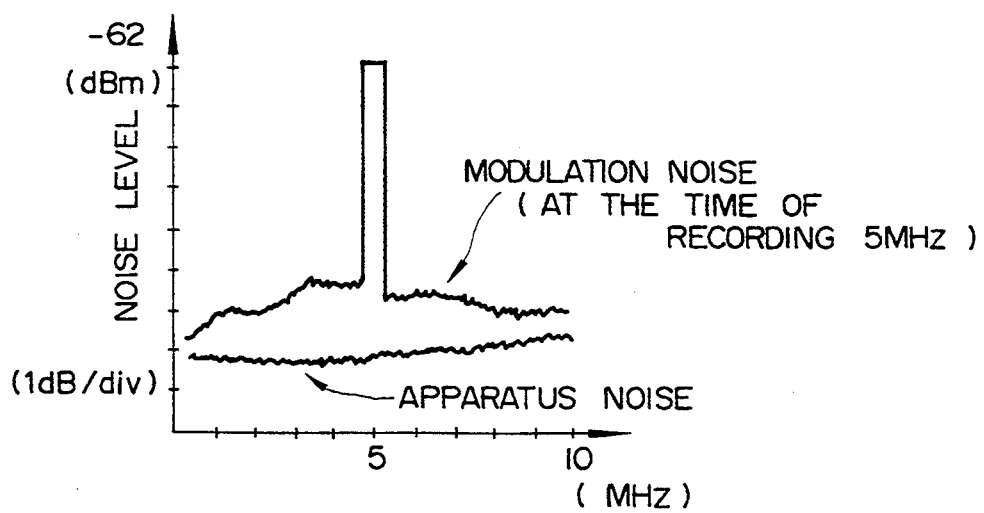
F I G. 3(A)
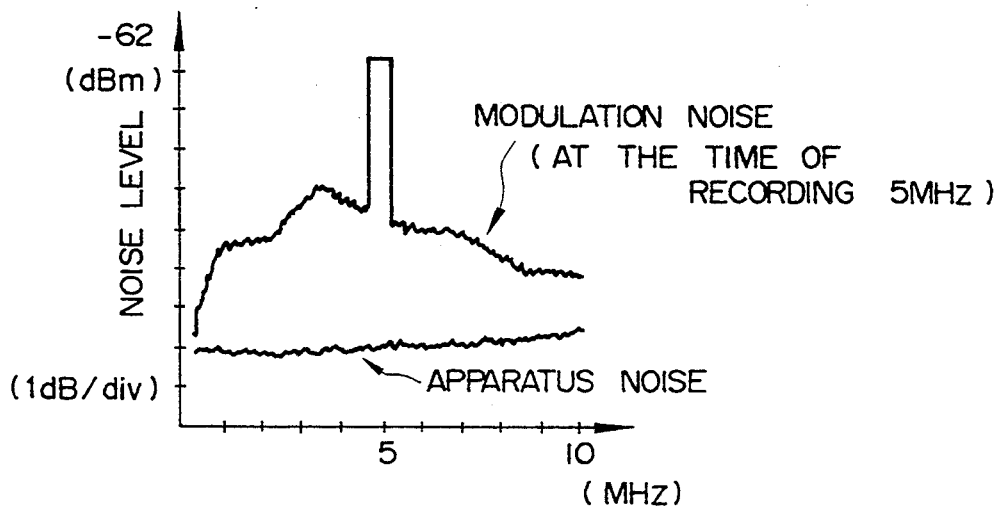
F I G. 3(B)
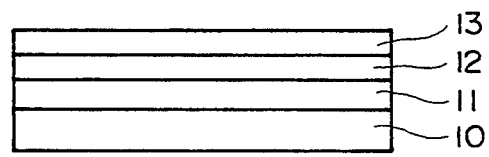
F I G. 4

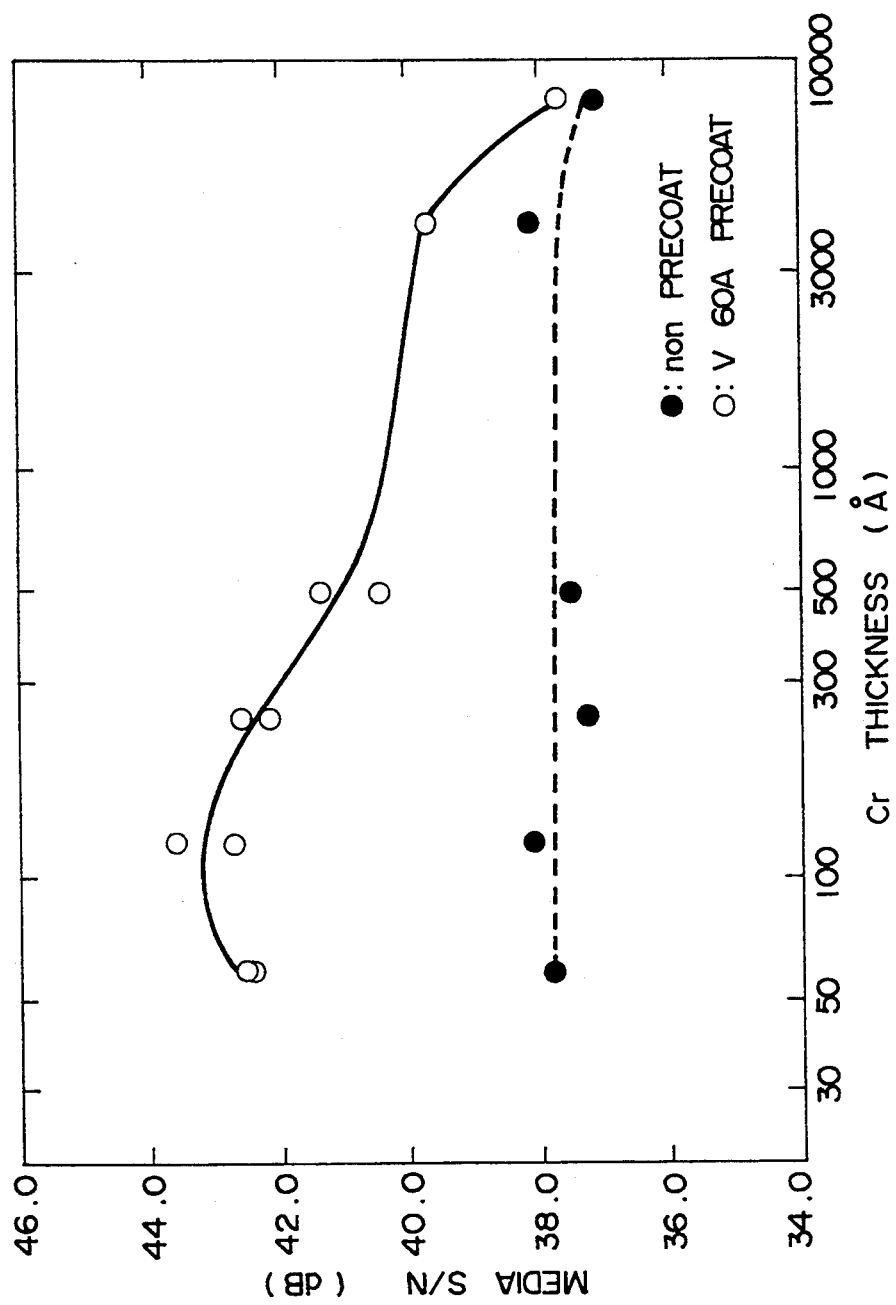
F I G. 5

MAGNETIC RECORDING MEDIUM HAVING A GLASS OR AMORPHOUS CARBON SUBSTRATE, VANADIUM OR MOLYBDENUM PRECOAT LAYER, CHROMIUM PRIMER LAYER AND COBALT MAGNETIC LAYER

This is a continuation of application Ser. No. 07/873,759, filed Apr. 27, 1992 which was abandoned upon the filing hereof.

FIELD OF THE INVENTION

This invention relates to a magnetic recording medium comprising a non-magnetic, mirror-surface substrate such as a glass substrate and particularly provides a magnetic recording medium wherein a modulation noise is reduced which is inherent to a medium wherein the non-magnetic, mirror-surface substrate is used.

BACKGROUND OF THE INVENTION

As a magnetic recording medium which is improved in properties by, as shown in FIG. 4, providing a preliminary layer 11 on a non-magnetic substrate 10 and laminating in order a primer layer 12 and a magnetic layer 13, there are a magnetic recording medium disclosed in Japanese Patent Laid-Open Publication No. 188732/1986 and a magnetic recording medium disclosed in Japanese Patent Laid-Open Publication No. 222021/1986.

The former is that wherein a non-magnetic, hard layer comprising an alumite layer is provided as the preliminary layer 11, having magnetic properties improved (crystalline orientating property) and a mechanical reliability improved. The latter is that wherein $ZrO_2$, $In_2O_3$ or $SnO_2$ film is formed to improve coercive force or residual magnetic flux density.

Meanwhile, recently, a higher density magnetic recording medium has been vigorously developed. To obtain a high density one, a recording medium is necessary which can keep stably narrow spacing between head and disc and has a high S/N (a ratio of signal to noise). Therefore, there is expected and used a magnetic recording medium comprising a substrate with mirror surface on which has no any projections or foreign materials (substrate having no texture treatment and having small surface-roughness), for example, a non-magnetic, mirror-surface substrate such as a glass substrate.

However, in the case that the non-magnetic, mirror-surface substrate such as the glass substrate is used, noise, particularly modulation noise tends to increase, causing decrease of S/N, disturbing a high density recording. For example, comparing, in the same sputtering condition, a medium wherein a substrate conventionally texture-treated is used with a medium wherein a substrate which is mirror-treated is used, the latter medium has a ratio of S/N deteriorated as large as about −7 dB.

SUMMARY OF THE INVENTION

An object of the present invention is to provide an improved magnetic recording medium having a high S/N ratio, wherein a non-magnetic, mirror-surface substrate such as a glass substrate is used and wherein modulation noise inherent to the non-magnetic, mirror-surface substrate is decreased.

Thus, the present invention provides, as shown in FIG. 1, a magnetic recording medium wherein a precoat layer 2 consisting of V (vanadium), Mo (molybdenum), NiP (nickel-phosphorus), C (carbon), Zr (zirconium) or Al (aluminum) and having a thickness of 30 to 14000 Å is provided on a non-magnetic, mirror-surface substrate 1, the magnetic layer 4 being provided on the precoat layer 2.

BRIEF DESCRIPTION OF THE DRAWINGS

In the drawings:

FIG. 1 is a sectional view showing one embodiment of a magnetic recording medium according to the present invention.

FIG. 2 is a chart showing the relationship between noise level and the thickness of a precoat layer in a magnetic recording medium according to the present invention.

FIG. 3(A) is a chart showing the noise spectrum of a magnetic recording medium, provided with a precoat layer, according to the present invention. FIG. 3(B) is a chart showing the noise spectrum of a magnetic recording medium, without a precoat layer, according to the conventional art.

FIG. 4 is a sectional view of a magnetic recording medium according to conventional art.

FIGS. 5, 6 and 7 are respectively graphs showing the results obtained in Test Examples 1, 2 and 3.

DETAILED DESCRIPTION OF THE INVENTION

Figure 6:
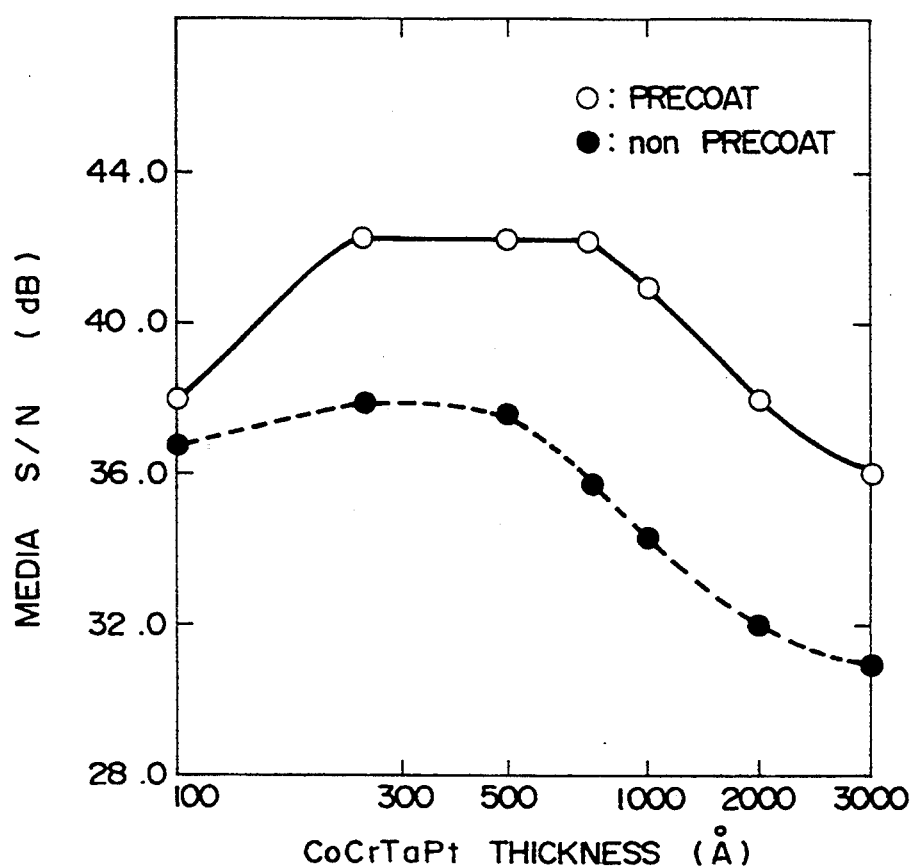

The present invention is detailedly illustrated.

Firstly, a non-magnetic, mirror-surface substrate 1 is prepared. As this substrate, a circular glass plate which is particularly prepared for a magnetic disc with crystalline or amorphous glass and has a predetermined outer diameter, inner diameter and thickness is preferable. Further, a substrate prepared with amorphous carbon can be also used. The substrate is formed so as to have a mirror surface without projections and foreign materials. The surface is also prepared so that texture treatment is not performed and surface roughness is few.

In the present invention, a precoat layer 2 is formed on a non-magnetic, mirror-surface substrate 1 thus prepared. As the precoat layer, V (vanadium), Mo (molybdenum), NiP (nickel-phosphorus), C (carbon), Zr (zirconium) or Al (aluminum) is used. Among these, V or Mo is preferably used. This precoat layer is normally formed by means of the sputtering method. The condition of the sputtering method, for example, temperature of substrate, Ar gas pressure or voltage, is decided depending upon respective materials used. The thickness of the precoat layer is 30 Å to 14000 Å, preferably 30 Å to 1000 Å.

Although this precoat layer is normally formed of one layer, it may be formed of two or more layers. For example, the case of two layers of Zr and V is more satisfactory than the case of one layer of Zr. Normally, the precoat layer is directly formed on the substrate, and a pretreated layer can be provided therebetween.

A magnetic layer 4 is laminated on the precoat layer 2 thus formed, and a primer layer 3 is normally formed therebetween. As the primer layer, Cr film is normally formed. Besides, there can be often used metals or alloys which are body-centered cubic crystals such as W or V having an interplanar spacing approximate to that of Cr. This primer layer 3 is normally formed by means of the sputtering method so as to have a thickness of about 60 to 8000 Å, preferably 60 to 4000 Å.

Further on this primer layer is formed the magnetic layer. Cobalt alloys are normally used for the magnetic layer. As the cobalt alloys, there are optionally used alloys such as CoNi, CoNiCr, CoNiPt, CoNiPtPCr, CoCrTa, CoCrPt or CoCrTaPt, which are alloyed to a degree not breaking the hexagonal (hcp) structure of Co. This magnetic layer is formed in a thickness of more than about 100 Å, preferably 100 to 2000 Å by means of a sputtering method under respective optional conditions.

In the case of using the medium as a disc or in order to determine read and write characteristics, a carbon layer 5 and a lubricant layer 6 such as a fluorinated lubricant are laminated on the magnetic layer 4.

According to the present invention, a precoat layer consisting of metals such as V or Mo is provided on a non-magnetic, mirror-surface substrate and a magnetic layer is formed on the precoat layer, whereby modulation noise inherent to such a non-magnetic, mirror-surface substrate is decreased and thus a magnetic recording medium having a high S/N ratio can be obtained.

Examples of the magnetic recording medium according to the present invention are detailedly illustrated below with the drawing.

EXAMPLES

The present invention is detailedly illustrated based on Examples, Comparative Examples and Test Examples.

Example 1

As a non-magnetic, mirror-surface substrate 1, a glass substrate having a diameter of 3.5 inches was used. The non-magnetic, mirror-surface substrate 1 was heated at 200° C. in DC magnetron sputtering apparatus. The background pressure was $3 \times 10^{-7}$ Torr.

On the non-magnetic, mirror-surface substrate 1 thus obtained was formed a film of V (vanadium) in each thickness of 30, 60, 500, 1000, 2000, 4000, 8000 and 16000 Å under a pressure of Ar (argon) gas of $2 \times 10^{-3}$ Torr as a precoat layer 2. Then, Cr layer was laminated under an Ar pressure of $0.45 \times 10^{-3}$ as a primer layer 3 in a thickness of 500 Å and $CoCr_{10.5}Ta_{5.5}Pt_{2.0}$ (cobalt/chromium/tantalum/platinum) layer was laminated in a thickness of 500 Å as a magnetic layer 4. In order to determine the read and write characteristics, C (carbon layer 5) was laminated in a thickness of 300 Å under a gas pressure of Ar of 10 mTorr and subsequently a lubricant layer 6 was applied in a thickness of 20 Å to prepare a disc (magnetic recording medium).

Example 2

The same manner as in Example 1 except that Mo (molybdenum) was used in place of V as a precoat layer 2 was repeated to obtain a medium. The thickness of the precoat layer 2 was 60 Å.

Example 3

The same manner as in Example 1 except that NiP (nickel-phosphorus) was used in place of V as a precoat layer 2 was repeated to obtain a medium. The thickness of the precoat layer 2 was 60 Å.

Example 4

The same manner as in Example 1 except that C (carbon) was used in place of V as a precoat layer 2 was repeated to obtain a medium. The thickness of the precoat layer 2 was 60 Å.

Example 5

The same manner as in Example 1 except that Al (aluminum) was used in place of V as a precoat layer 2 was repeated to obtain a medium. The thickness of the precoat layer 2 was 60 Å.

Comparative Example 1

In Example 1, Cr film was formed as a primer layer 3 without forming a precoat layer 2 and $CoCr_{10.5}Ta_{5.5}Pt_{2.0}$ film was formed as a magnetic layer 4. Other conditions were the same as in Example 1.

The read and write characteristics of the medium thus obtained were determined by means of a thin film head having a linear velocity of 7.6 m/s, a spacing amount of 0.05 µm, a track width of 8 µm and a gap length of 0.3 µm. The result of the determination of S/N ratio was a recording frequency of 5 MHz.

Test Example 1

(1) The same manner as in Example 1 except that a V film in a thickness of 60 Å was formed as a precoat layer and a Cr film in each thickness between 60 and 8000 Å was formed as a primer layer was repeated to prepare a magnetic recording medium.

(2) The same manner as in the above (1) except that a precoat layer was not formed was repeated to obtain a medium.

(3) The read and write characteristics of the medium obtained in the above (1) and (2) were determined by means of a thin film head having a track width of 8 µm and a gap length of 0.3 µm.

Test Example 2

(1) The same manner as in Example 1 except that a V film in a thickness of 60 Å was formed as a precoat layer, a Cr film in a thickness of 500 Å as a primer layer and a $CoCr_{10.5}Ta_{5.5}Pt_{2.0}$ film in each thickness between 100 to 3000 Å was formed as a magnetic layer was repeated to prepare a magnetic recording medium.

(2) The same manner as in the above (1) except that a precoat layer was not formed was repeated to prepare a medium.

(3) The read and write characteristics of the medium obtained in the above (1) and (2) were determined by means of a thin film head as abovementioned.

Test Example 3

(1) The same manner as in Example 1 except that a V film in a thickness of 60 Å as a precoat layer, a Cr film in a thickness of 1000 Å as a primer layer and a $CoCr_{10.5}Ta_{5.5}Pt_{4.0}$ film in a thickness of 500 Å as a magnetic layer were formed was repeated to prepare a magnetic recording medium.

(2) The same manner as in the above (1) except that a precoat layer was not formed was repeated to prepare a medium.

(3) The read and write characteristics of the medium thus obtained were determined as abovementioned.

Table 1 shows a comparison of a S/N of medium having a precoat layer consisting of various materials prepared in Examples 1 to 5 with the case, without a precoat layer, according to Comparative Example 1. However, only the case of a thickness of 60 Å is shown as the case of a vanadium precoat layer according to Example 1.

TABLE 1

|  | Precoat layer | S/N |
| --- | --- | --- |
| Example 1 | V (60 Å) | +6.7 dB |
| Example 2 | Mo (60 Å) | +5.9 dB |

TABLE 1-continued

|  | Precoat layer | S/N |
| --- | --- | --- |
| Example 3 | NiP (60 Å) | +4.8 dB |
| Example 4 | C (60 Å) | +2.8 dB |
| Example 5 | Al (60 Å) | +2.0 dB |
| Comparative Example 1 | none | 0 dB |

FIG. 2 is a graph showing the relationship between noise level of a medium consisting of a V (vanadium) precoat layer, having a various thickness, formed in Example 1 and the thickness of the precoat layer. This is compared and shown by taking the value in the case without a precoat layer as 0 dB. The axis of abscissas (thickness of precoat layer) is shown by scale of logarithm. As apparent from the figure, by forming a precoat layer having a thickness of 30 to 14000 Å, a medium having a good S/N more than zero, is obtained.

Further, FIG. 3(A) shows a noise spectrum when a V (vanadium) precoat layer is present and FIG. 3(B) shows a noise spectrum when a V (vanadium) precoat layer is absent. As understood from this, those that has a V precoat layer are low in the increase of modulation noise to apparatus noise and the noise level is greatly reduced.

FIG. 5 shows the results obtained in Test Example 1. As evident from this figure, in the medium having a primer layer in a thickness between 60 to 8000 Å, a S/N ratio of the medium with a precoat layer is higher than that of the medium without a precoat layer. A primer layer in a thickness of 60–4000 Å is preferable since it is apparently effective and productive as shown in FIG. 5.

FIG. 6 shows the results obtained in Test Example 2. As evident from the figure, in the medium having a magnetic layer in a thickness of 100 to 3000 Å, a S/N ratio of the medium with a precoat layer is higher than that of the medium without a precoat layer in the whole range of the above thickness of the magnetic layer.

In view of the degradation of the magnetic property in the surface, a magnetic layer in a thickness of 100 to 2000 Å is preferable.

Figure 7:
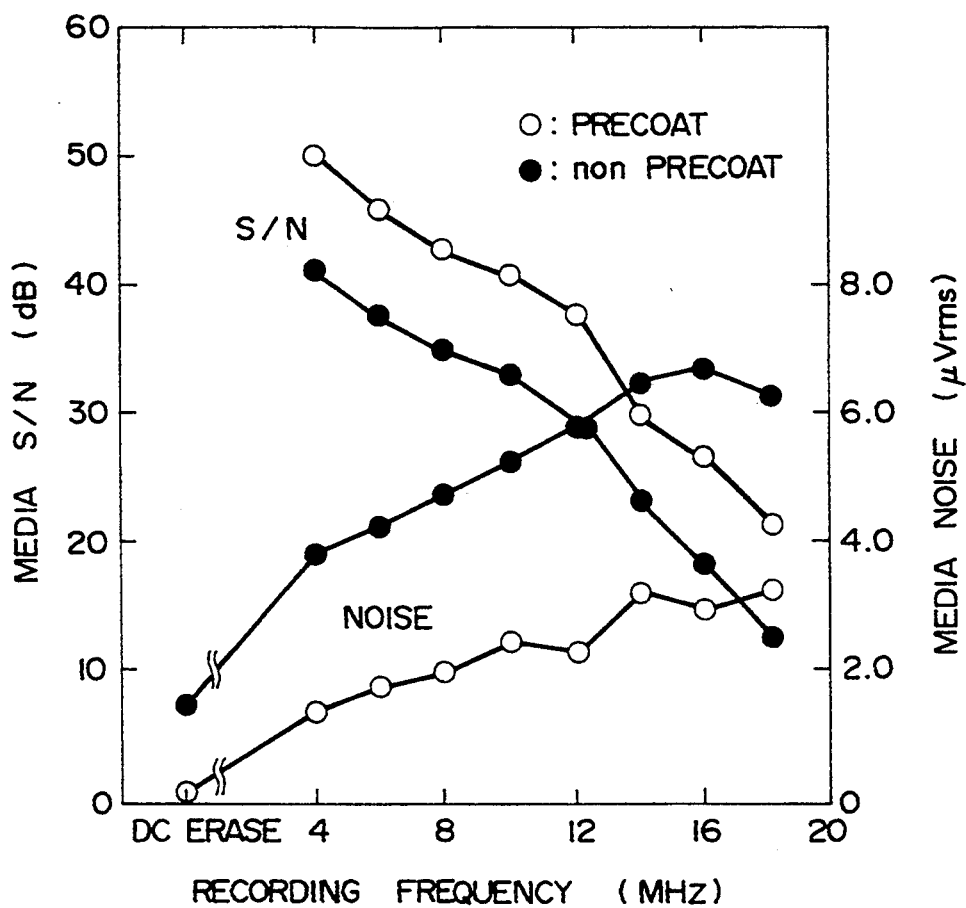

FIG. 7 concerning the results obtained in Test Example 3 shows a relationship between media S/N and media noise and recording frequency in media with and without a precoat layer. DC erase noise is also shown in this figure.

Increases of a DC erase noise and a modulation noise relating to a recording frequency were small in the medium with a precoat layer. Contrary to this, both of them were large in the medium without a precoat layer.

As to the decrease of these modulation noise, it is assumed that because of the formation of a precoat layer, a component which is magnetically orientated in the surface is added to a component which is magnetically orientated in a direction of the thickness of film (perpendicular direction to the surface), whereby the intensity of magnetic anisotropy in the surface is weakened and, as a result, noise level decreases. Further, it is assumed that a decrease of a DC noise is due to comminution of magnetic particles and a uniform distribution thereof.

Example 6

Amorphous carbon was used as said non-magnetic mirror surface substrate 1 and Mo (molybdenum) was used as a precoat layer 2. The thickness of the precoat layer 2 was 60 Å. Other conditions are the same as in Example 1.

Comparative Example 2

The same manner as in Example 6 except that Mo (molybdenum) was not formed as a precoat layer 2 was repeated.

The read and write characteristics of the medium thus obtained were determined by means of a thin film head having a linear velocity of 7.6 m/s, a spacing amount of 0.15 μm, a track width of 8 μm and a gap length of 0.3 μm. The result of the determination of S/N was a recording frequency of 6.67 MHz. As a result, if the noise level of the medium according to Comparative Example 2 was made 0 dB, a S/N of +2.35 dB was obtained in the medium according to Example 6.

Example 7

A Zr film was formed on the glass substrate which was non-magnetic, mirror-surface substrate 1 in a thickness of 60 Å as a first precoat layer at a substrate temperature of 200° C. under a sputtering pressure of 5 mTorr. Subsequently, a V film was formed in a thickness of 60 Å as a second precoat layer under a pressure of 5 mTorr to obtain a substrate. Further, Cr film was formed in a thickness of 500 Å as a primer layer 3 at a substrate temperature of 200° C. under a sputtering pressure of 0.45 mTorr and then $Cr_{10.5}Ta_{5.5}Pt_{2.0}$ film was formed in a thickness of 500 Å. In order to determine read and write characteristics, a carbon film 5 was formed and a lubricant film 6 was applied in the same manner as in Example 1.

Example 8

In Example 7, Zr which was a first precoat layer was formed on a glass substrate in a thickness of 60 Å and a V film as a second precoat layer was not formed and further Cr as a primer layer 3 and CoCrTaPt as a magnetic layer 4 were formed. Other conditions were the same as in Example 7.

S/N of the medium thus obtained was determined at a recording frequency of 6.67 MHz in the same manner as in Example 1.

When the noise level of the medium according to Comparative Example 1 was made as 0 dB, a S/N as high as +6.0 dB was obtained in the medium of Example 7 and a S/N of +0.4 dB was obtained in the medium of Example 8.

As apparent from Examples, Comparative Examples and Test Examples, in the magnetic recording medium according to the present invention, a precoat layer such as V (vanadium), Mo (molybdenum), NiP (nickel-phosphorus), C (carbon), Zr (zirconium) or Al (aluminum) is provided on a non-magnetic, mirror-surface substrate and modulation noise inherent to the medium wherein a non-magnetic, mirror-surface substrate is used decreases and thus a magnetic recording medium having a high S/N is obtained.

What is claimed is:
1. A magnetic recording medium comprising:
   a non-magnetic, mirror-surface substrate selected from the group consisting of glass and amorphous carbon, said substrate having a mirror surface which is not texture-treated;
   a precoat layer consisting of any of V and Mo formed on the non-magnetic mirror-surface substrate, said precoat layer having a thickness of about 30–4,000 Å;

a primer layer laminated on the precoat layer, said primer layer being Cr and having a thickness of about 60–4000 Å; and a magnetic layer laminated on the primer layer, said magnetic layer being selected from the group consisting of CoCrTa, CoCrPt and CoCrTaPt and having a thickness of about 100–2000 Å.

2. A magnetic recording medium according to claim 1 wherein the precoat layer is at least more than one layer.

3. A magnetic recording medium according to claim 1 further comprising a carbon layer and a lubricant layer on the magnetic layer.

* * * * *